United States Patent Office 3,209,666
Patented Oct. 5, 1965

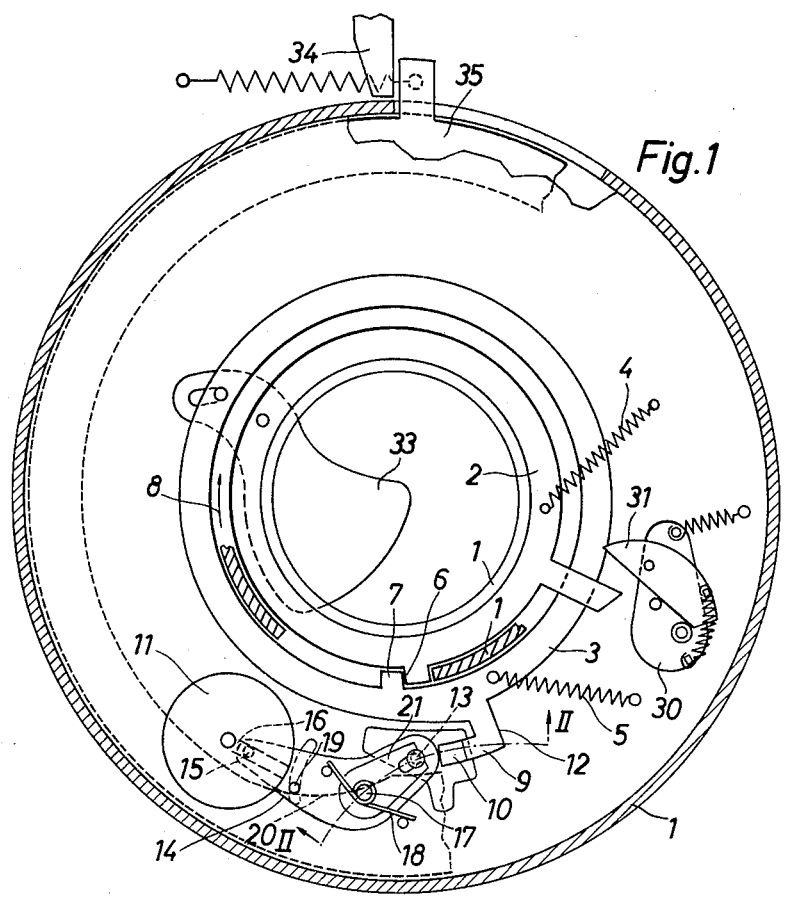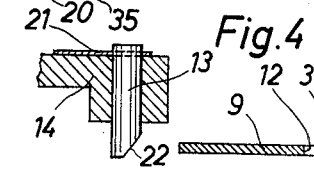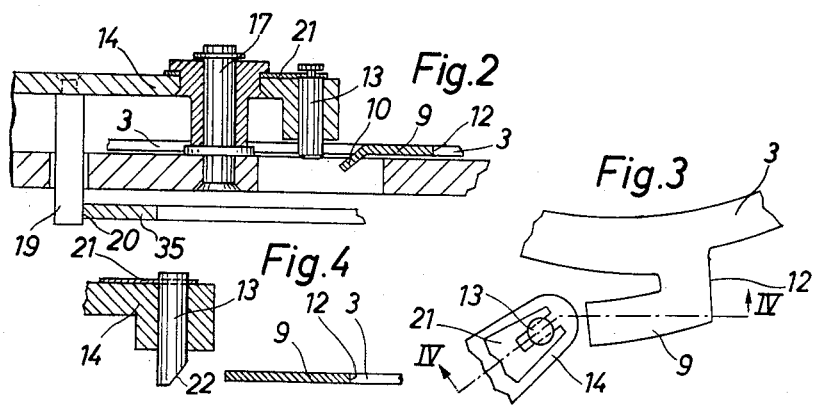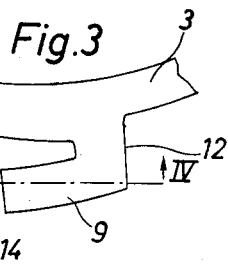
INVENTOR.
GERD KIPER
BY Michael S. Striker
ATTORNEY.

3,209,666
SHUTTER ASSEMBLIES FOR PHOTOGRAPHIC CAMERAS
Gerd Kiper, Unterhaching, near Munich, Germany, assignor to Agfa Aktiengesellschaft, Leverkusen, Germany
Filed Mar. 11, 1963, Ser. No. 264,099
Claims priority, application Germany, Mar. 9, 1962, A 39,665
11 Claims. (Cl. 95—63)

The present invention relates to photographic cameras.

More particularly, the present invention relates to shutter assemblies for photographic cameras, particularly of the type which are adapted to be automatically operated at least with respect to setting of elements of the camera which determine exposure of the film therein.

The present invention is especially applicable to those types of cameras in which the shutter automatically runs down immediately upon cocking thereof and in which the exposure time is automatically set during the cocking of the shutter.

With cameras of this type there is a particular problem in providing accurate exposure times. The reason for this is that the exposure-time setting structure is of a type which, particularly when the camera is operated rapidly, will provide a recoiling and vibrating of the retarding mechanism so that as a result the actual exposure time will not accurately correspond to the exposure time which is set into the camera. This problem has been recognized but up to the present time it has only been avoided by providing special structures which delay the setting of the exposure time and thus the actuation of the shutter to make an exposure, and this latter solution to the problem is not only undesirable from the standpoint of added costs as well as added weight and space required for the additional retarding elements, but in addition it is of a serious disadvantage under conditions where it is desired to rapidly make exposures as when photographing athletic events or other sport events. Because of the presence of the retarding structure which is provided to prevent rebounding and chattering of the shutter retarding structure, it is not possible to make one exposure after another as rapidly as might be desired under all conditions.

It is accordingly a primary object of the present invention to provide a shutter assembly for cameras of the above type which will reliably avoid any vibratory recoiling or the like of the shutter retarding mechanism irrespective of how rapidly the camera structure is operated.

Another object of the present invention is to provide this result without the use of any special retarding structure so that the added cost as well as the space and weight required for such structure is eliminated with the structure of the invention.

Still another object of the present invention is to provide for a shutter assembly of a camera of the above type a retarding mechanism which will enable the exposure-time setting cam to have a camming edge which will very greatly reduce the possibility of undesirable vibrations of the retarding structure.

It is furthermore an object of the present invention to provide for a structure of the above type elements which will cooperate with a minimum of friction and wear during running down of the shutter.

Also it is an object of the present invention to provide for a camera of the above type a shutter assembly whose elements will cooperate with each other during cocking of the shutter with a friction which while insufficient to require an undesirably large force to cock the shutter is nevertheless sufficient to reduce the tendency of the structure to vibrate in a manner which will prevent an accurate exposure time from being provided, particularly in combination with a structure where the retarding mechanism is of such a design that it enables the exposure-time setting structure to have a camming edge which also contributes to the minimizing of any possibility of vibrations which will prevent accurate exposure times from being provided.

With the above objects in view the invention includes, in a camera, a shutter assembly which includes a shutter drive means for driving the shutter of the camera at least from an open to a closed position, this shutter drive means including at least one shutter drive member. A retarding means cooperates with the shutter drive means to retard the running down of the shutter, and this retarding means includes a drive member and a driven member which is adapted to be driven by the drive member of the retarding means. A coupling means couples the drive members of the shutter drive means and retarding means, respectively to each other during running down of the shutter so that the drive member of the shutter drive means will drive the drive member of the retarding means, and there is provided a transmission means which is operatively connected to the drive and driven members of the retarding means for transmitting a drive from the drive to the driven member of the retarding means while at the same time providing between the shutter drive means and the retarding means a transmission ratio which gradually diminishes during running down of the shutter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly schematic illustration of a shutter assembly according to the present invention, the section of FIG. 1 being taken in a plane which is normal to the optical axis and FIG. 1 showing fragmentarily structure for automatically setting the exposure time according to the lighting conditions;

FIG. 2 is a sectional view of part of the structure of FIG. 1, on an enlarged scale as compared to FIG. 1, taken along line II—II of FIG. 1 in the direction of the arrows;

FIG. 3 is a schematic illustration of another embodiment of a coupling means according to the present invention for coupling the retarding means to the shutter drive means; and FIG. 4 is a sectional view of the structure of FIG. 3 taken along line IV—IV of FIG. 3 in the direction of the arrows.

Referring now to FIG. 1, there is shown therein a shutter housing 1 which includes a shutter drive means part of which is composed of a pair of rings 2 and 3 supported by suitable bearings for rotary movement about the optical axis which passes through the centers of the rings 2 and 3 which respectively extend along concentric circles. When an exposure is to be made, after the shutter is cocked, the rings 2 and 3 will turn in the same direction with the ring 2 turning first in order to open the shutter and with the ring 3 following the ring 2 after a predetermined period of time so as to close the shutter, and both of the rings 2 and 3 turn together during cocking of the shutter so that the shutter remains closed during cocking thereof. Ring 3 forms a drive member of the shutter drive means 2, 3 which drives the shutter from its open to its closed position, and the shutter drive means includes in addition to the rings 2 and 3 a pair of springs 4 and 5 respectively connected operatively to the rings 2 and 3 for urging the latter to the illustrated rest position where a projection 6 of the ring 2 engages the end of a slot formed in an inner tube of the housing 1, so that in this way the rest position shown in FIG. 1 is determined. The ring 3 has an inwardly directed projection 7 engaging the outwardly directed projection 6 of the ring 2, and the spring 5 urges the projection 7 into engagement with the projection 6 while the spring 4 urges the projection 6 against the stop formed by part of the housing 1. In order to cock the shutter the operator will in a known way be able to turn the lever 30, this lever 30 turning in a counterclockwise direction, as viewed in FIG. 1, during the cocking of the shutter, and during this turning of the lever 30 a swing-member 31 pivotally carried thereby engages a projection of the ring 2 for turning the latter in a clockwise direction, as viewed in FIG. 1, in opposition to the spring 4 which thus becomes tensioned. The turning of the ring 2 at this time is transmitted from the projection 6 thereof to the projection 7 of the ring 3 so that the latter turns with the ring 2, the ring 3 at this time turning in opposition to the spring 5 which thus also becomes tensioned during cocking of the shutter. Thus, during cocking of the shutter the rings 2 and 3 will turn as a unit in the direction of the arrow 8, and the shutter blades 33, only one of which is shown for the sake of clarity, will turn together with the rings 2 and 3 at this time so that the shutter remains closed. The illustrated structure is an embodiment of an automatic shutter which is automatic in the sense that the exposure is automatically made when the lever 30 has been turned to an angle which is sufficient to cock the shutter. Thus, it will be seen that while the operator continues to turn the ring 30 the swing-member 31 pivotally carried thereby will engage the projection of the ring 2 and will continue to turn the latter in opposition to the ring 4 only until the tip of the swing-member 31 rides off the tip of the radial projection of the ring 2 which is engaged by the swing-member 31, and thereupon the spring 4 will automatically return the ring 2 to its starting position while the ring 3 remains, in a manner described below, in the position to which it has been turned until released by the retarding mechanism, so that the turning of the ring 2 back to its starting position in advance of the ring 3 will serve to move the shutter blades 33 outwardly away from the opical axis to a position opening the shutter in order to make the exposure. The spring 5 will return the ring 3 to its initial position relative to the ring 2, in order to close the shutter, in a greater or lesser period of time in accordance with the particular setting of the shutter-retarding structure by the exposure-time setting structure.

In order to avoid the drawbacks mentioned above, the structure of the invention includes a coupling means according to the present invention which couples the shutter drive member 3 to the retarding means. This retarding means includes a retarding lever 14 which forms a drive member of the retarding means and which is supported for turning movement by a stationary pin 17 carried by a transverse wall of the housing 1 extending parallel to the optical axis. The retarding means also includes a driven member in the form of a rotary mass 11 which acts through the inertia of its mass in order to retard the shutter drive member 3. The coupling means 13, 9 includes a coupling portion 9 which is integral with and projects from the ring 3, this coupling portion 9 having the configuration shown most clearly in FIG. 1 and being in its entirety in the same plane as the remainder of the ring 3 with the exception of the free end portion 10 of the coupling portion 9, this free end portion 10 being inclined as is apparent from FIG. 2. The lever 14 of the retarding means is formed with a bore which extends parallel to the optical axis and which receives the coupling pin 13 of the coupling means, this coupling pin 13 being supported in the bore of the lever 14 not only for axial movement but also for rotary movement. A transmission means is operatively connected to the members 11 and 14 of the retarding means for transmitting a drive from the drive member 14 to the driven member 11, and this transmission means provides between the shutter drive means 2-5 and the retarding means 11, 14 a transmission ratio which gradually diminishes during running down of the shutter. This transmission means is in the form of a pin-and-slot connection 15, 16 between the lever 14 and the rotary mass 11, and in the particular example illustrated the slot of the pin-and-slot connection is in the form of a groove 16 which extends radially with respect to the axis of the rotary mass 11 and is formed directly in the rotary mass 11, this groove 16 receiving a pin 15 which is fixedly carried by the lever 14. The lever 14 fixedly carries a pin 19 which engages a camming edge 20 of an exposure-time setting ring 35, this latter ring 35 being turnable to an angular position which will introduce into the camera a given exposure time according to the angular position of the ring 35, and this ring 35 is capable of being automatically set by an automatic light-responsive structure, fragmentarily shown at 34 in FIG. 1, in such a way that the angular position of the ring 35 will correspond to the lighting conditions. Such automatic structures which are capable of sensing the light intensity and automatically setting the exposure time are well known in the art. As is apparent from FIGS. 1 and 2, the pin 19 extends through an arcuate slot whose center is in the axis of the pivot pin 17 for the lever 14, this slot passing through the transverse wall of the housing 1 which carries the pin 17 so that the pin 19 may extend to that side of the wall at which the ring 35 is located, as indicated in FIG. 2. Thus, in accordance with the angular position of the ring 35 the camming edge 20 thereof will act on the pin 19 to locate the lever 14 initially at an angular position which will determine the extent to which the ring 3 is retarded and which will thus determine the exposure time. A spring means acts on the coupling pin 13 to urge the latter to the position illustrated in FIG. 2, and this spring means takes the form of a simple leaf spring 21 carried by the sleeve of the lever 14 which is turnable on the pin 17 and having a slot in which a reduced portion of the pin 13 is located so that in this way the pin 13 is free to turn about its own axis while at the same time having an axial position determined by the spring 21, and of course the pin 13 is capable of moving upwardly, as viewed in FIG. 2, in opposition to the spring 21 which yields to permit such upward movement of the pin 13.

During cocking of the shutter, as described above, the ring 3 turns in the direction of the arrow 8 and of course the inclined portion 10 of the ring 3 rides under the bottom free end of the pin 13 gradually raising the latter in opposition to the spring 21 until the upper surface of the coupling portion 9 rides along the bottom end of the pin 13, and the continued turning of the ring 3 during cocking of the shutter displaces the edge 12 of the coupling portion 9 beyond the pin 13 which snaps behind the edge 12 under the action of the spring 21 so that the engagement of the pin 13 with the edge 12 couples the ring 3 to the retarding means, and of course this coupling of the shutter drive means and the retarding means takes place before the swing-member 31 rides off the tip of the projection of the ring 2 which is engaged by the swing-member 31 during cocking of the shutter. It should be noted that a wire spring 18 is coiled about the pin 17 and engages a stationary pin as well as an additional pin carried by the lever 14 so as to continuously urge the lever 14 in a counterclockwise direction, as viewed in FIG. 1, thus maintaining the pin 19 against the camming edge 20.

As soon as the tip of the swing-member 31 rides off the projection of the ring 2 engaged by this swing-member 31, the spring 4 returns the ring 2 to its starting position thus turning the shutter blades 33 in order to open the shutter as described above. The running down of the drive member 3 is however delayed by the retarding means 11, 14 until the pin 13 rides off the outer end of the edge 12. Thus, immediately after the ring 2 returns to its starting position the spring 5 attempts to return the ring 3 to its starting position and at this time the edge 12 of the coupling portion 9 of the drive member 3 presses against the pin 13 and turns the lever 14 in a clockwise direction, as viewed in FIG. 1, in opposition to the spring 18 while the lever 14 acts through the pin-and-slot connection 15, 16 on the rotary retarding mass 11 to turn the latter in a counterclockwise direction, as viewed in FIG. 1, and during this turning of the members 11 and 14 of the retarding means the pin 13 rolls along the edge 12 until it rides off the outer end thereof, so that in this way the frictional resistance to movement of the pin 13 with respect to the edge 12 is reduced to a minimum and the wear on the pin 13 is distributed all around the exterior surface of the pin 13. Thus, wearing of the parts which might eventually undesirably influence the exposure time is very greatly avoided with this construction. As soon as the pin 13 rides off the outer end of the edge 12 the spring 5 can quickly return the ring 3 to its starting position closing the shutter.

During the cocking of the shutter the unillustrated exposure-time setting structure which responds automatically to the lighting conditions operates in a manner well known in the art to turn the ring 35 in the manner described above to an angular position corresponding to the lighting conditions, and a lever 34 of the automatic, light-responsive structure is fragmentarily illustrated in FIG. 1, this lever 34 acting on a projection of the ring 35 to turn the latter to an angular position in accordance with the lighting conditions, and thus the camming edge 20 will act on the pin 19 to initially position the lever 14 at an angular position which will provide an exposure time in accordance with the lighting conditions. If the operator should very quickly actuate the structure such as a single operating member which when actuated will result in automatic positioning of the ring 35 as well as automatic cocking and release of the shutter, there will be, in spite of a sudden impact between the camming edge 20 and the pin 19, no undesirable recoiling, chattering, or vibratory movement of any type of the pin 19 away from and back toward the camming edge 20, so that even under these conditions the camming edge 20 rides smoothly along the pin 19, and the retarding means 11, 14 will at all times provide an accurate exposure time corresponding to the angular position of the ring 35. This result is achieved because the camming edge 20 can be made with relatively small inclination and very smoothly curved, as indicated in FIG. 1, as a result of the transmission ratio between the drive member 3 and the retarding means 11, 14. As was pointed out above, while the edge 12 presses against the pin 13 the lever 14 is turned in opposition to the spring 18 in a clockwise direction so that the pin 15 rides along the slot or groove 16 outwardly away from the center of the rotary mass 11, and as a result of this transmission means 15, 16 there is provided between the drive member 3 of the shutter drive means and the retarding means 11, 14 a transmission ratio which gradually diminishes during running down of the shutter, and this transmission ratio is at a maximum at the beginning of the running down of the shutter when the exposure time is set to provide the longest exposure time capable of being set into the camera. Moreover, the smooth riding of the camming edge 20 along the pin 19 even during very rapid actuation of the camera is achieved also, in part, by the sliding of the upper surface of the coupling portion 9 along the bottom end of the pin 13 during cocking of the shutter. This frictional engagement between the coupling pin 13 and the coupling portion 9 provides a braking action which together with the relatively flat curve 20 guarantees no undesirable vibrations of the lever 14. While this braking action is sufficient to eliminate, in combination with the configuration of the camming edge 20, any undesirable vibrations of the retarding means, nevertheless it is sufficiently low so that there is absolutely no appreciable delay in the setting of the exposure time and in the coupling of the retarding means 11, 14 to the drive member 3, so that during cocking and release of the shutter the pin 13 will in all cases snap behind the edge 12 and at the same time, since undesirable vibrations of the lever 14 are eliminated, the pin 19 will remain at all times in engagement with the camming edge 20 before the opening movement of the shutter blades 33 commences.

Thus, with the combination of the features of the invention it is possible to retain all of the advantages of the individual elements of the combination while at the same time, without requiring any additional structure, it is possible to provide the additional adavntage of guaranteeing a vibration-free control of the exposure time. Thus, special retarding devices which up to the present time were required either between the exposure-time setting structure or the manual setting structure and the shutter release structure, can be eliminated with the structure of the invention so that the disadvantages resulting from the presence of such additional delaying structure are completely eliminated and at the same time the setting of the exposure time and operation of the shutter can take place without any delay with one exposure being made right after another one so that it is possible to make successive exposures very rapidly with the structure of the invention, and this type of operation is particularly important for making photographs of athletic events and of rapidly moving subjects in general, and the danger of inaccurate exposure times is completely eliminated.

The embodiment of the invention which is illustrated in FIGS. 3 and 4 differs from that of FIGS. 1 and 2 in that the coupling portion 9 of the shutter drive member 3 does not have any inclined portion corresponding to the free end portion 10 described above. Instead the entire coupling portion 9 is located in the same plane as the remainder of the ring 3 and in this case it is the pin 13 which is provided with an inclined surface portion 22 which is engaged by the end of the coupling portion 9 during cocking of the shutter so that the free end of the coupling portion 9 will slide along the inclined surface portion 22 of the pin 13 to raise the latter in opposition to the spring 21 until the bottom surface of the pin 13 engages the top surface of the coupling portion 9 which then rides along this bottom surface during the remainder of the cocking of the shutter as described above. Of course, with this embodiment also before the end of the cocking movement of the lever 30 the pin 13 will snap behind the edge 12. While it is possible to provide a structure as shown in FIGS. 3 and 4, the structure of FIGS. 1 and 2 is greatly preferred because with the embodiment of FIGS. 1 and 2 the pin 13 can rotate while riding along the edge 12 to eliminate frictional resistance and uniformly distribute the wear all around the surface of the pin 13, whereas with the embodiment of FIGS. 3 and 4 in order to maintain the surface 22 directed toward the free end of the coupling portion 9 at all times the pin 13 of FIGS. 3 and 4 is capable only of moving axially but is not free to rotate so that with this embodiment there is the disadvantage of a frictional sliding of the pin 13 along the edge 12 during retarding of the shutter drive member 3.

Of course, further variations in the structure are possible. For example, the coupling portion 9 may be connected to the ring 3 for resilient, yieldable axial movement and in this case the pin 13 can be maintained axially stationary with respect to the lever 14, while still being free to rotate. Moreover, the pin 13 can be replaced by a projection while coupling portion 9 can be constructed, at least in part, as a pin.

In addition, the structure of the invention is not limited to a shutter which operates as described above. Thus, the structure of the invention can also be used with that type of automatic shutter where a shutter drive ring moves first in one direction and then in an opposite direction during running down of the shutter, and with such a construction the coupling elements 9 and 13 will slide along each other during the opening of the shutter and will be coupled to each other to provide the retarding action only during the closing of the shutter when the shutter drive ring oscillates back toward its starting position. With shutters where it is desired to set the exposure time after the shutter has been fully cocked, the structure of the invention can also be used, and in this case the spring-pressed coupling pin will be coupled with a coupling portion of a shutter drive ring or other shutter driving structure during the closing of the shutter, and the exposure-time setting structure will be actuated during the coupling of the pin with the coupling portion of the shutter drive means. However, the structure of the invention is of particular advantage with a structure as described above where the shutter will automatically close immediately after it is fully cocked and where the exposure time is set during the cocking of the shutter, and all of these operations can be performed by manual actuation of a single member. Also, the structure of the invention is particularly suitable for those cameras where heretofore it was not possible to accurately set the exposure time before release of the shutter either with any accuracy or at best without sufficient accuracy.

It is of course possible, although less desirable, to provide the coupling between the coupling pin 13 and the coupling portion 19 during the opening movement of the shutter blades, but in any case simultaneously with the setting of the exposure time and before the largest opening of the shutter is reached.

As was mentioned above, the provision of the transmission means 15, 16 which provides between the shutter drive means and retarding means a transmission ratio which gradually diminishes during running down of the shutter, enables a smooth camming edge 20 of relatively small inclination to be provided, and this type of camming edge is also attainable because of the presence of a rotary mass 11 rather than a retarding structure such as an escapement wheel and anchor. Thus, the particular retarding means 11, 14 and transmission means 15, 16 enables the provision of a camming edge 20 which permits achievement of the result of vibration-free setting of the exposure time irrespective of the rapidity with which the camera is manipulated.

It will be understood that each of the elements described above, or two or more together, may also find a useful application in other types of cameras differing from the types described above.

While the invention has been illustrated and described as embodied in camera shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a shutter assembly for a photographic camera, in combination, shutter drive means operable for driving a shutter of the camera at least from an open position of the shutter to a closed position thereof, said shutter drive means including at least one shutter drive member movable during driving of the shutter from an initial position when said shutter is open to a final position when said shutter is closed; retarding means for retarding the running down of the shutter during operation of said shutter drive member from said initial to said final position thereof to move the shutter from said open to said closed position thereof, said retarding means including a retarding drive member which drives said retarding means and a retarding drive member driven by said retarding drive member of said retarding means; coupling means automatically coupling said shutter drive member of said shutter drive means to said retarding drive member of said retarding means for driving said retarding means during running down of the shutter by said shutter drive means; and transmission means connecting said retarding drive member to said retarding driven member for transmitting a drive from said retarding drive member to said retarding driven member of said retarding means, said transmission means having a maximum transmission ratio when said shutter drive member is in its initial position thereof at the beginning of the running down of the shutter and said transmission ratio gradually diminishing during operation of said shutter drive means causing running down of the shutter and having a minimum when said shutter drive member reaches its final position at the end of the running down of the shutter.

2. In a shutter assembly for a photographic camera, in combination, shutter drive means operable for driving a shutter of the camera at least from an open position of the shutter to a closed position thereof, said shutter drive means including at least one shutter drive member movable during driving of the shutter from an initial position when said shutter is open to a final position when said shutter is closed; retarding means for retarding the running down of the shutter during operation of said shutter drive member from said initial to said final position thereof to move the shutter from said open to said closed position thereof, said retarding means including a retarding drive member which drives said retarding means and a retarding driven member driven by said retarding drive member of said retarding means; coupling means automatically coupling said shutter drive member of said shutter drive means to said retarding drive member of said retarding means for driving said retarding means during running down of the shutter by said shutter drive means; transmission means connecting said retarding drive member to said retarding driven member for transmitting a drive from said retarding drive member to said retarding driven member of said retarding means, said transmission means having a maximum transmission ratio when said shutter drive member is in its initial position thereof at the beginning of the running down of the shutter and said transmission ratio gradually diminishing during operation of said shutter drive means causing running down of the shutter and having a minimum when said shutter drive member reaches its final position at the end of the running down of the shutter; and exposure time setting means engaging one of said members of said retarding means for setting the latter to provide a predetermined exposure time according to the lighting conditions.

3. In a shutter assembly for a photographic camera, in combination, shutter drive means operable for driving a shutter of the camera at least from an open position of the shutter to a closed position thereof, said shutter drive means including at least one shutter drive member movable during driving of the shutter from an initial position when said shutter is open to a final position when said shutter is closed; retarding means for retarding the running down of the shutter during operation of said shutter drive member from said initial to said final position thereof to move the shutter from said open to said closed position thereof, said retarding means including a retarding drive member which drives said retarding means and a retarding driven member driven by said retarding drive member of said retarding means; coupling means automatically coupling said shutter drive member of said shutter drive means to said retarding drive member of said retarding means for driving said retarding means during running down of the shutter by said shutter drive means; transmission means connecting said retarding drive member to said retarding driven member for transmitting a drive from said retarding drive member to said retarding driven member of said retarding means, said transmission means having a maximum transmission ratio when said shutter drive member is in its initial position thereof at the beginning of the running down of the shutter and said transmission ratio gradually diminishing during operation of said shutter drive means causing running down of the shutter and having a minimum when said shutter drive member reaches its final position at the end of the running down of the shutter; and automatic exposure-time setting means engaging one of said members of said retarding means for setting the latter to provide a predetermined exposure time according to the lighting conditions.

4. In a shutter assembly for photographic cameras, in combination, shutter drive means for driving a shutter of the camera at least from an open position thereof to a closed position thereof, said shutter drive means including at least one shutter drive member; retarding means retarding the running down of the shutter during driving thereof by said shutter drive member, said retarding means including at least one retarding drive member and at least one retarding driven member adapted to be driven by said retarding drive member; a pin carried by one of said drive members; a coupling portion carried by the other of said drive members and engaging said pin during cocking of the shutter; spring means operatively connected to said pin for providing resilient, yieldable, axial movement thereof relative to said coupling portion during movement of the latter relative to said pin upon cocking of the shutter and said pin engaging an edge of said coupling portion to provide coupling engagement between said shutter drive means and retarding means; and transmission means connecting said retarding drive member to said retarding driven member for transmitting a drive from said retarding drive to said retarding driven member of said retarding means, said transmission means having a maximum transmission ratio at the beginning of the running down of the shutter when the retarding means is set to provide the longest exposure time and said transmission ratio gradually diminishing during running down of the shutter.

5. In a shutter assembly for photographic cameras, in combination, shutter drive means for driving a shutter of the camera at least from an open position thereof to a closed position thereof, said shutter drive means including a shutter drive member; retarding means for retarding the running down of the shutter by said shutter drive means, said retarding means including a retarding drive member and a retarding driven member adapted to be driven by said retarding drive member; a coupling pin supported for axial and rotary movement by said retarding drive member of said retarding means and having a free end portion projecting beyond the latter drive member; a coupling portion fixed to said shutter drive member of said shutter drive means for movement therewith, said free end of said coupling pin being located in the path of movement of said coupling portion during cocking of the shutter and said coupling portion having an inclined section which initially engages said free end of said pin for moving the latter axially; spring means operatively connected to said pin and yieldably opposing axial movement thereof by said coupling portion of said shutter drive member of said shutter drive means, said spring means snapping said pin behind an edge of said coupling portion when the shutter is cocked so that during running down of the shutter said shutter drive member will act through said coupling portion thereof on said pin to drive said retarding drive member of said retarding means while said pin is free to rotate so as to reduce the frictional resistance to movement of said pin relative to said coupling portion; and transmission means for transmitting a drive from said retarding drive member to said retarding driven member, said transmission means having a maximum transmission ratio at the beginning of the running down of the shutter when the latter is set to provide the maximum exposure time and said transmission ratio gradually diminishing during running down of the shutter.

6. In a shutter assembly for photographic cameras, in combination, shutter drive means operable for driving a shutter of the camera at least from an open position thereof to a closed position thereof, said shutter drive means movable during driving of the shutter from an initial position when said shutter is open to a final position when said shutter is closed and including a shutter drive member; retarding means for retarding the running down of the shutter by said shutter drive means during operation of said shutter drive means from said initial to said final position thereof, said retarding means including a retarding drive member which drives the retarding means and a retarding driven member adapted to be driven by said retarding drive member of said retarding means; automatic exposure-time setting means engaging said retarding means for setting the latter automatically to provide an exposure time according to the lighting conditions; coupling means coupling said drive members to each other during running down of the shutter so that the drive is transmitted from said shutter drive member of said shutter drive means to said retarding drive member of said retarding means, said coupling means including a coupling portion fixed to one of said drive members and a coupling pin carried by the other of said drive members and sliding along and frictionally engaging said coupling portion during cocking of the shutter as well as during automatic setting of the exposure time; and transmission means connecting said retarding drive member to said retarding driven member for transmitting a drive from said retarding drive member of said retarding means to said retarding driven member thereof, said transmission means providing a maximum transmission ratio when said shutter drive means is in its initial position thereof at the beginning of the running down of the shutter and said transmission ratio gradually diminishing during operation of said shutter drive means causing running down of the shutter and having a minimum when said shutter drive means reaches its final position at the end of the running down of the shutter.

7. In a shutter assembly for photographic cameras, in combination, shutter drive means for driving a shutter of the camera at least from an open position to a closed position, said shutter drive means including a shutter drive member; retarding means for retarding the running down of the shutter by said shutter drive means, said retarding means including a retarding drive member and a retarding driven member adapted to be driven by said retarding drive member of said retarding means; coupling means coupling said drive members to each other during cocking of the shutter for transmitting the drive of said shutter drive member of said shutter drive means to said retarding drive member of said retarding means during running down of the shutter; and transmission means connecting said retarding drive member to said retarding driven member for transmitting movement of said retarding drive member of said retarding means to said retarding driven member, said transmission means having a maximum transmission ratio at the beginning of the running down of the shutter when the latter is set to provide the maximum exposure time and said transmission ratio gradually diminishing during running down of the shutter, said retarding drive member of said retarding means being in the form of a lever and said driven member of said retarding means being in the form of a rotary mass, and said transmission means being in the form of a pin-and-slot connection between said members of said retarding means.

8. In a shutter assembly for photographic cameras, in combination, shutter drive means for driving a shutter of the camera at least from an open position to a closed position, said shutter drive means including a shutter drive member; retarding means for retarding the running down of the shutter by said shutter drive means, said retarding means including a retarding drive member and a retarding driven member adapted to be driven by said retarding drive member of said retarding means; coupling means coupling said drive members to each other during cocking of the shutter for transmitting the drive of said shutter drive member of said shutter drive means to said retarding drive member of said retarding means during running down of the shutter; and transmission means connecting said retarding drive member to said retarding driven member for transmitting movement of said retarding drive member of said retarding means to said retarding driven member thereof, said transmission means having a maximum transmission ratio at the beginning of the running down of the shutter when the latter is set to provide the maximum exposure time and said transmission ratio gradually diminishing during running down of the shutter, said retarding drive member of said retarding means being in the form of a lever and said retarding driven member of said retarding means being in the form of a rotary mass, and said transmission means being in the form of a pin-and-slot connection between said members of said retarding means, said slot extending radially with respect to the axis of rotation of said rotary mass.

9. In a shutter assembly for photographic cameras, in combination, shutter drive means for driving a shutter of the camera at least from an open position to a closed position, said shutter drive means including a shutter drive member; retarding means for retarding the running down of the shutter by said shutter drive means, said retarding means including a retarding drive member and a retarding driven member adapted to be driven by said retarding drive member of said retarding means; coupling means coupling said drive members to each other during cocking of the shutter for transmitting the drive of said shutter drive member of said shutter drive means to said retarding drive member of said retarding means during running down of the shutter; and transmission means connecting said retarding drive member to said retarding driven member for transmitting movement of said retarding drive member of said retarding means to said retarding driven member thereof, said transmission means having a maximum transmission ratio at the beginning of the running down of the shutter when the latter is set to provide the maximum exposure time and said transmission ratio gradually diminishing during running down of the shutter, said retarding drive member of said retarding means being in the form of a lever and said retarding driven member of said retarding means being in the form of a rotary mass, and said transmission means being in the form of a pin-and-slot connection between said members of said retarding means, said slot extending radially with respect to the axis of rotation of said rotary mass and being formed in said rotary mass.

10. In a shutter assembly for photographic cameras, in combination, shutter drive means for driving a shutter of the camera at least from an open position to a closed position, said shutter drive means including a shutter drive member; retarding means for retarding the running down of the shutter by said shutter drive means, said retarding means including a retarding drive member and a retarding driven member adapted to be driven by said retarding drive member of said retarding means; coupling means coupling said drive members to each other during cocking of the shutter for transmitting the drive of said shutter drive member of said shutter drive means to said retarding drive member of said retarding means during running down of the shutter; and transmission means connecting said retarding drive member to said retarding driven member for transmitting movement of said retarding drive member of said retarding means to said retarding driven member thereof, said transmission means having a maximum transmission ratio at the beginning of the running down of the shutter when the latter is set to provide the maximum exposure time and said transmission ratio gradually diminishing during running down of the shutter, said retarding drive member of said retarding means being in the form of a lever and said retarding driven member of said retarding means being in the form of a rotary mass, and said transmission means being in the form of a pin-and-slot connection between said members of said retarding means, said slot extending radially with respect to the axis of rotation of said rotary mass and being in the form of a groove which is formed in said rotary mass.

11. In a shutter assembly for a photographic camera, in combination, shutter drive means operable for driving the shutter of a camera at least from an open position of the shutter to a closed position thereof; said shutter drive means movable during driving of the shutter from an initial position when said shutter is open to a final position when said shutter is closed; retarding means for retarding the running down of the shutter during operation of said shutter drive means from said initial to said final position thereof to move the shutter from said open to said closed position thereof; and transmission means connecting said shutter drive means and said retarding means for transmitting a drive from said shutter drive means to said retarding means with the transmission ratio of said transmission means having a maximum when said shutter drive means is in its initial position thereof at the beginning of the running down of the shutter and with said transmission ratio gradually diminishing during operation of said shutter drive means causing running down of the shutter and having a minimum when said shutter drive means reaches its final position at the end of the running down of the shutter.

References Cited by the Examiner

UNITED STATES PATENTS 3,093,048  6/63  Starp _____ 95—63

JOHN M. HORAN, *Primary Examiner.*

NORTON ANSHER, *Examiner.*